Patented Nov. 28, 1933

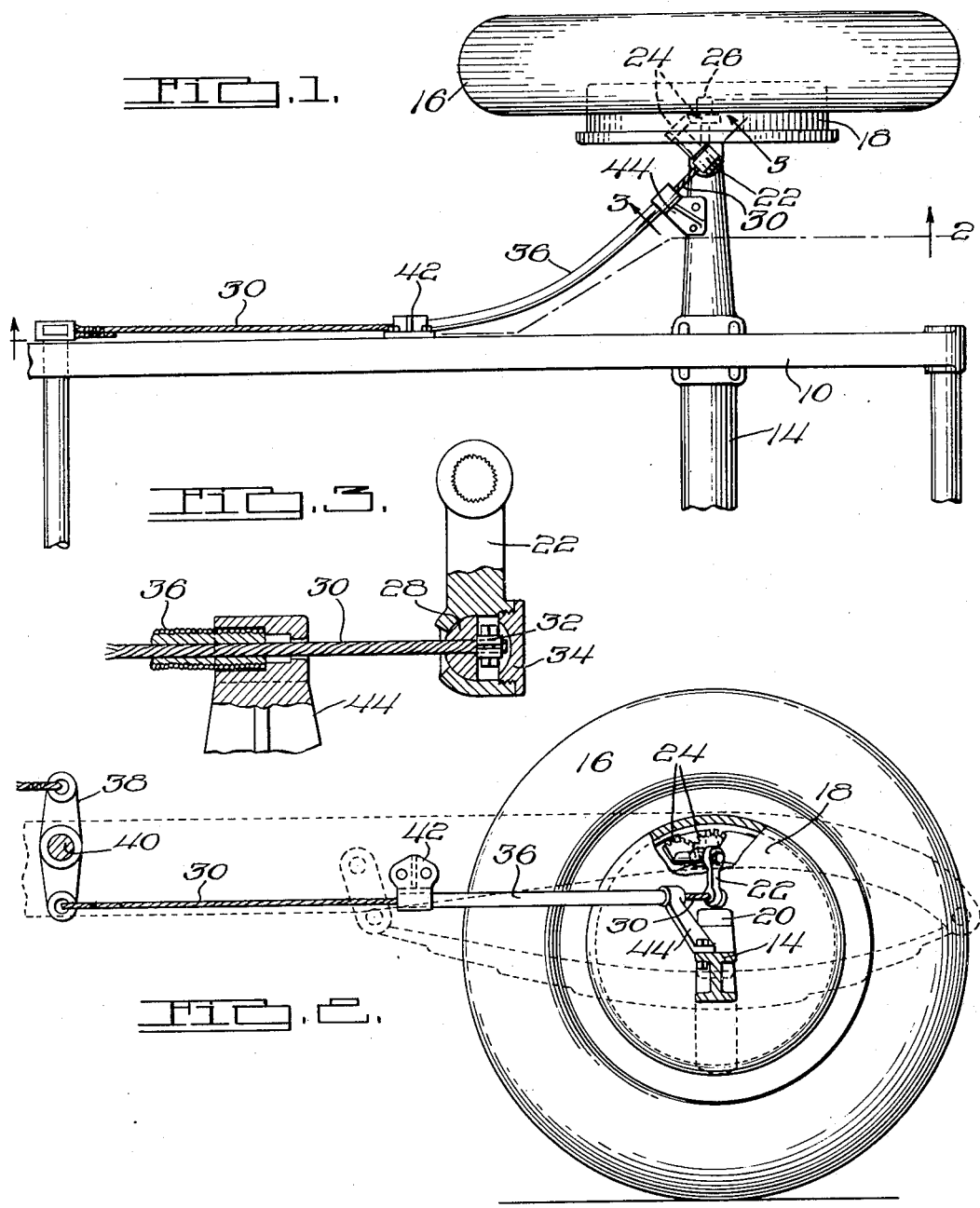

1,936,910

UNITED STATES PATENT OFFICE

1,936,910

BRAKE-OPERATING MEANS

Montgomery W. McConkey, South Bend, Ind., assignor to Bendix Brake Company, South Bend, Ind., a corporation of Illinois Application April 23, 1928, Serial No. 272,099
Renewed March 20, 1931

3 Claims. (Cl. 188—194)

This invention relates to brakes, and is illustrated as embodied in a simple operating mechanism for a front wheel automobile brake. An object of the invention is to provide a control mechanism for a brake on a front automobile wheel including a tension cable or the like, operating through a Bowden-type casing which compensates for relative movement of the chassis frame and the axle, and in which the cable or its equivalent is directly connected to operating means swiveling with the wheel by means of a joint which is arranged when the brake is applied immediately in line with the king pin of the wheel. Thus the swiveling of the wheel is taken care of by the joint while the relative movement of the axle and frame is taken care of by the flexing of the Bowden-type casing.

Preferably there is a support on the axle spaced a short distance from the swiveling axis of the wheel to which the end of the Bowden casing is connected, so that the cable passes directly through the end of the casing to the lever or other means swiveling with the wheel and to which it is connected by a joint shown as being a ball-and-socket joint.

The above and other objects and features of the invention, including various novel and desirable details of construction, will be apparent from the following description of the illustrative embodiment shown in the accompanying drawing, in which:

Figure 1 is a top plan view of the parts of an automobile chassis adjacent the left front wheel;

Figure 2 is a section approximately on the line 2—2 of Figure 1 and showing most of the parts of the operating mechanism in side elevation; and Figure 3 is a section longitudinally through the control mechanism on the line 3—3 of Figure 1.

The illustrated chassis includes the usual frame 10 supported by springs 12 on a rear axle (not shown) and on a front axle 14. At each end of the front axle 14 there is arranged the usual front wheel 16 having a brake 18 and swiveled by a king pin 20 or the like at the end of the axle 14. Except as further described below, these parts may be of any usual and desired construction.

The brake 18 is shown as applied by a lever 22 swinging in a vertical plane at an angle of approximately 45 degrees to the plane of the wheel, and which is shown as operating through intermeshing bevel gears 24 to operate the usual brake cam 26. The lever 22 and the other parts described all swivel with the wheel in steering the automobile. The lever 22 is formed at its lower end with a spherical socket for a ball member 28 secured on the end of a cable 30 or an equivalent tension element having at its end a fitting 32 pulling against the ball member 28 to operate the lever 22. The socket is shown closed by a threaded cover 34.

The cable 30 passes rearwardly through a Bowden-type casing 36 to an arm 38 on an operating shaft 40 mounted on the chassis frame and connected to the brake pedal or other controlling means. The Bowden-type casing 36 may be of any desired construction and is shown as being wound from a continuous wire to give a flexible conduit which does not change substantially in length. The rear end of the conduit 36 is secured to the chassis frame 10 by a suitable bracket 44 carried by the front axle 14 and arranged just behind and inwardly from the swiveling axis of the wheel.

It will be observed that by the construction described the swiveling of the wheel is taken care of by the ball-and-socket joint between the cable 30 and the lever 22, which joint is arranged when the brake is applied substantially in the swiveling axis of the wheel, whereas the relative movement of the axle 14 and the frame 10 due to deflections of the springs 12 is taken care of by the flexing of the Bowden casing 36.

While one illustrative construction has been described in detail, it is not my intention to limit the scope of the invention to that particular construction or otherwise than by the terms of the appended claims.

I claim:

1. A vehicle having an axle, a wheel swiveled thereon, a brake associated therewith and a spring on the axle supporting a frame, in combination with a casing supported at its opposite ends in brackets on the frame and on the axle, together with intermeshing gears for operating the brake swiveling with the wheel and a tension element passing through the casing connected to operate the gears by a joint positioned when the brake is applied substantially in the swiveling axis of the wheel.

2. A vehicle having a wheel with a brake, in combination with an operating connection for the brake extending at an acute angle to the wheel plane, and means operated thereby including a pair of intermeshing bevel gears and a device perpendicular to the wheel plane operated by said gears.

3. A vehicle having a frame and an axle, a wheel swiveled on the axle, a brake associated with the wheel, a spring on the axle supporting the frame, a casing supported at its opposite ends in brackets on the frame and on the axle, intermeshing gears swiveling with the wheel for operating the brakes, and a tension element passing through the casing and connected to operate the gears by a joint positioned when the brake is applied substantially in the swiveling axis of the wheel, said element moving the joint transversely of said axis in applying the brake.

MONTGOMERY W. McCONKEY.